(12) United States Patent
Miura et al.

(10) Patent No.: US 6,932,206 B2
(45) Date of Patent: Aug. 23, 2005

(54) ONE-WAY CLUTCH

(75) Inventors: Yoshihisa Miura, Nara (JP); Tetsuya Otani, Saitama (JP)

(73) Assignees: Koyo Seiko Co., LTD, Osaka (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/632,109

(22) Filed: Aug. 1, 2003

(65) Prior Publication Data

US 2004/0094382 A1 May 20, 2004

(30) Foreign Application Priority Data

Aug. 2, 2002 (JP) ..................................... P.2002-225783

(51) Int. Cl.[7] .............................................. F16D 41/07
(52) U.S. Cl. ..................................... 192/45.1; 192/41 A
(58) Field of Search ............................. 192/45.1, 41 A; 188/82.8

(56) References Cited

U.S. PATENT DOCUMENTS

| 5,480,013 A | * | 1/1996 | Fujiwara et al. | 192/45.1 |
| 5,601,167 A | * | 2/1997 | Kinoshita et al. | 192/45.1 |
| 5,630,670 A | * | 5/1997 | Griffin et al. | 384/606 |
| 6,082,511 A | * | 7/2000 | Shirataki et al. | 192/41 R |

* cited by examiner

Primary Examiner—Saul Rodriguez
(74) Attorney, Agent, or Firm—Arent Fox PLLC (57) ABSTRACT

A one-way clutch having a plurality of sprags (3) arranged at an annular space between a driving side member and a driven side member along a circumferential direction thereof, two cages (4, 5) on an outer side and an inner side for retaining the sprags, and a spring member (6) in an annular shape, in which the outer side cage (4), the inner side cage (5) and the spring member are respectively formed with pockets for sprags (4a, 5a 6a) of sufficiently large numbers and the sprags are contained at portions of the pockets. The pockets of a number the same as a number of pieces of using the sprags may be formed at any of the annular members of the outer side cage (4) and the like.

5 Claims, 7 Drawing Sheets

ONE-WAY CLUTCH

BACKGROUND OF THE INVENTION

The present invention relates to a one-way clutch.

There is a one-way clutch mounted to an annular space formed between a driving side member and a driven side member for transmitting rotation of the driving side member in one direction to the driven side member via a sprag.

The one-way clutch is provided with a plurality of sprags arranged at an annular space between a driving side member and a driven side member in a circumferential direction thereof, two cages on an outer side and an inner side for retaining the sprags and an annular spring member for urging to erect the sprags at inside of the annular space by spring force thereof.

The outer side cage, the inner side cage and the spring member are respectively formed with pockets for sprags of numbers the same as a number of pieces of the sprags at a pitch of an equal angle in the circumferential direction and the sprags are contained in the pockets.

In the above-described constitution, when the driving side member is rotated relative to the driven side member in one direction, the respective sprags are erected at inside of the annular face between the two members along a radius direction thereof and stretched between the two members to be brought into a locked state and rotation of the driving side member in the one direction is transmitted to the driven side member. When the driving side member is rotated in a reverse direction relative to the driven side member, the respective sprags are brought into a fallen attitude to follow rotation of the driving side member and the driving side member ring is rotated idly relative to the driven side member.

Meanwhile, there is a case in which a value of necessary transmission torque of the above-described one-way clutch differs by a place of use even with the same dimension. What contributes to the transmission torque is the sprag and therefore, in the case of a one-way clutch having a large capacity of the transmission torque, a number of pieces of using the sprags is large and in the case of a one-way clutch having a small capacity of the transmission torque, the number of pieces of using the sprags is small.

In this way, according to the one-way clutch, the number of pieces of using the sprags frequently differs even with the same dimension.

In respective constituent parts of the one-way clutch, annular members of the outer side cage, the inner side cage and the like respectively include pockets for containing the sprags. In the annular member having a constant dimension, when the number of pieces of using the sprags is increased or reduced, it is necessary to increase or reduce the number of pockets by changing a pitch between the pockets. In order to fabricate the annular member of the outer side cage or the like having a different number of the pockets, a die in correspondence therewith needs to newly prepare and a problem that cost is increased is posed.

SUMMARY OF THE INVENTION

According to the invention, in order to resolve the above-described problem at least one annular member of an outer side cage, an inner side cage and a spring member in an annular shape is made to be able to be used commonly in other one-way clutch having the same dimension and a different number of pieces of using sprags as a common part.

In order to solve the aforesaid object, the invention is characterized by having the following arrangement.

Aspect 1. A one-way clutch mounted to an annular space formed between a driving side member and a driven side member for transmitting rotation of the driving side member in one direction to the driven side member, the one-way clutch comprising:

a plurality of sprags arranged at the annular space along a circumferential direction thereof;

a first and second cages on an inner side and an outer side at the annular space, the first cage including a plurality of retaining pockets for retaining the sprags and at least one non-retaining pockets which does not retains the sprags and the second cage including a plurality of retaining pockets for retaining the sprags;

an annular spring member disposed between the first and second cages including a plurality of urging pockets for urging the sprags to erect the sprags and at least one non-retaining pockets which does not urge the sprags, wherein the retaining pockets and the non-retaining pockets of the first cages are formed through the first cages at a pitch of a substantially equal angle in the circumferential direction, and wherein respective positions of the retaining pockets of the first cages, respective positions of the retaining pockets of the second cage and respective positions of the urging pockets of the spring member correspond to each other in a radial direction thereof.

Aspect 2. The one-way clutch according to the aspect 1, wherein the second cage includes at least one non-retaining pockets which does not retain the sprags and a position of which corresponds to a position of the non-retaining pockets of the first cage.

Aspect 3. The one-way clutch according to the aspect 1, wherein the first cage is an inner side cage and the second cage is an outer side cage.

Aspect 4. The one-way clutch according to the aspect 1, wherein a sum of a number of the retaining pocket and a number of the at least one non-retaining pocket of the first cage corresponds to an upper limit number of pieces of the sprags which is set for an upper limit value of a required transmission torque.

Aspect 5. The one-way clutch according to the aspect 1, wherein the second cage includes, at a portion between adjacent two of the retaining pockets and the non-retaining pockets thereof, a contact piece brought into contact with a peripheral face of one of the driving side member of the driven side member.

Aspect 6. The one-way clutch according to the aspect 1, wherein the number of the sprags is an even number and the respective sprags are arranged at positions opposed to the other sprags in the diameter direction.

Aspect 7. The one-way clutch according to the aspect 1, wherein the retaining pockets and the non-retaining pockets of the first cage have a same shape, and the urging pockets and the non-urging pockets have a shame shape.

BRIEF DESCRIPTION OF THE DRAWINGS

FIGS. 4A to 4C illustrate development views of annular members shown in FIG. 3, FIG. 4A shows the outer side cage, FIG. 4B shows the ribbon spring and FIG. 4C shows the inner side cage, respectively.

DETAILED DESCRIPTION OF PREFERRED EMBODIMENTS

First Embodiment

Figure 1:
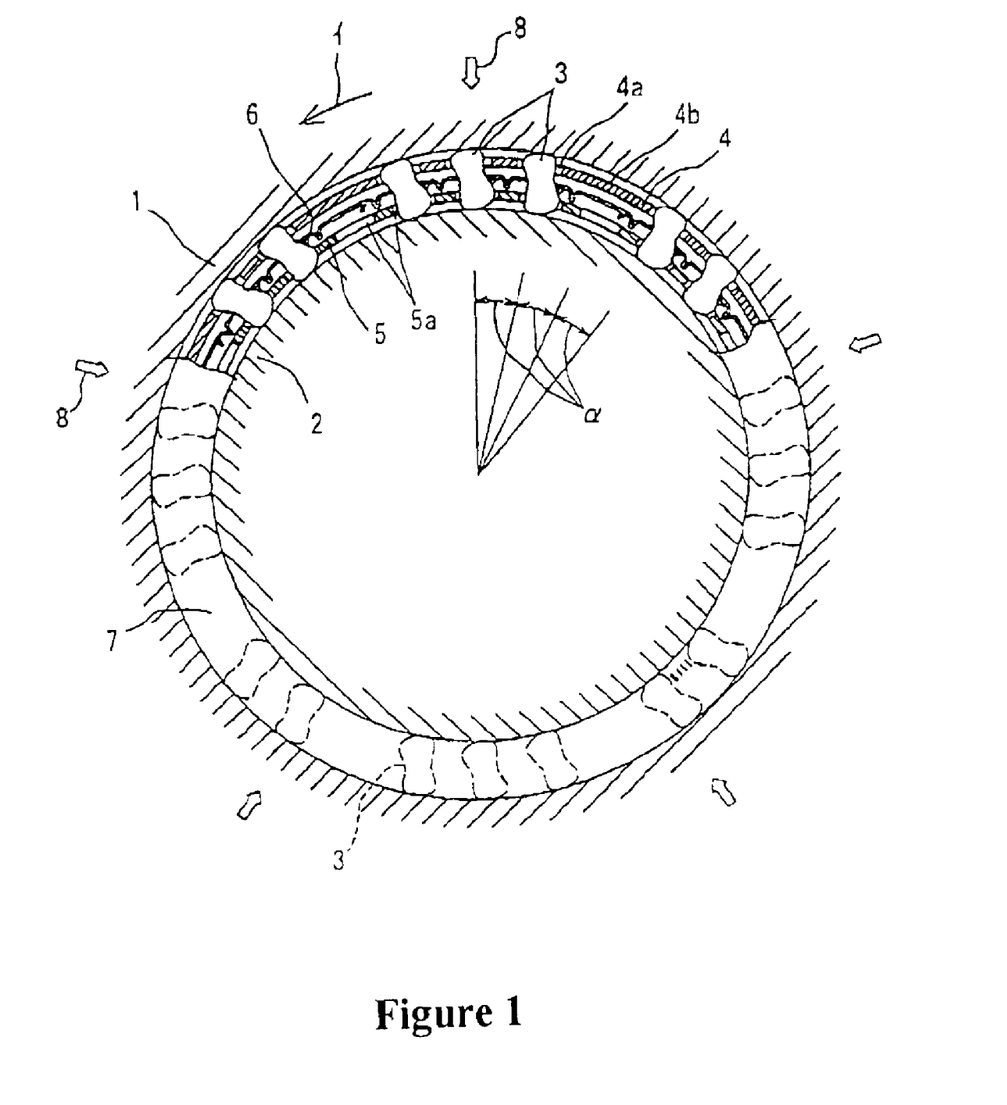
FIG. 1 is a front view of a one-way clutch according to a first embodiment of the invention showing inside thereof by breaking a portion thereof.
Figure 2:
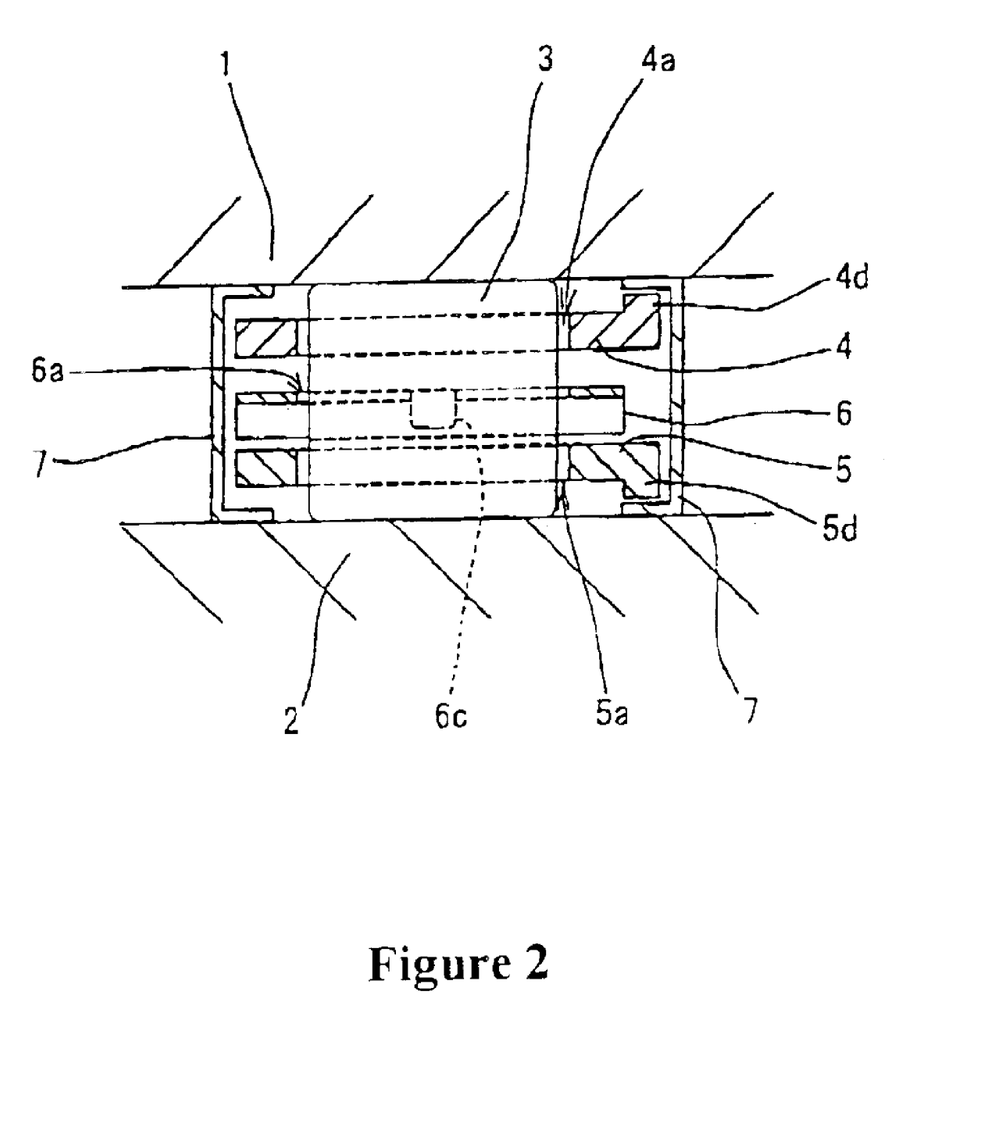
FIG. 2 is an enlarged sectional view cut along an axial direction of the one-way clutch of FIG. 1.
Figure 3:
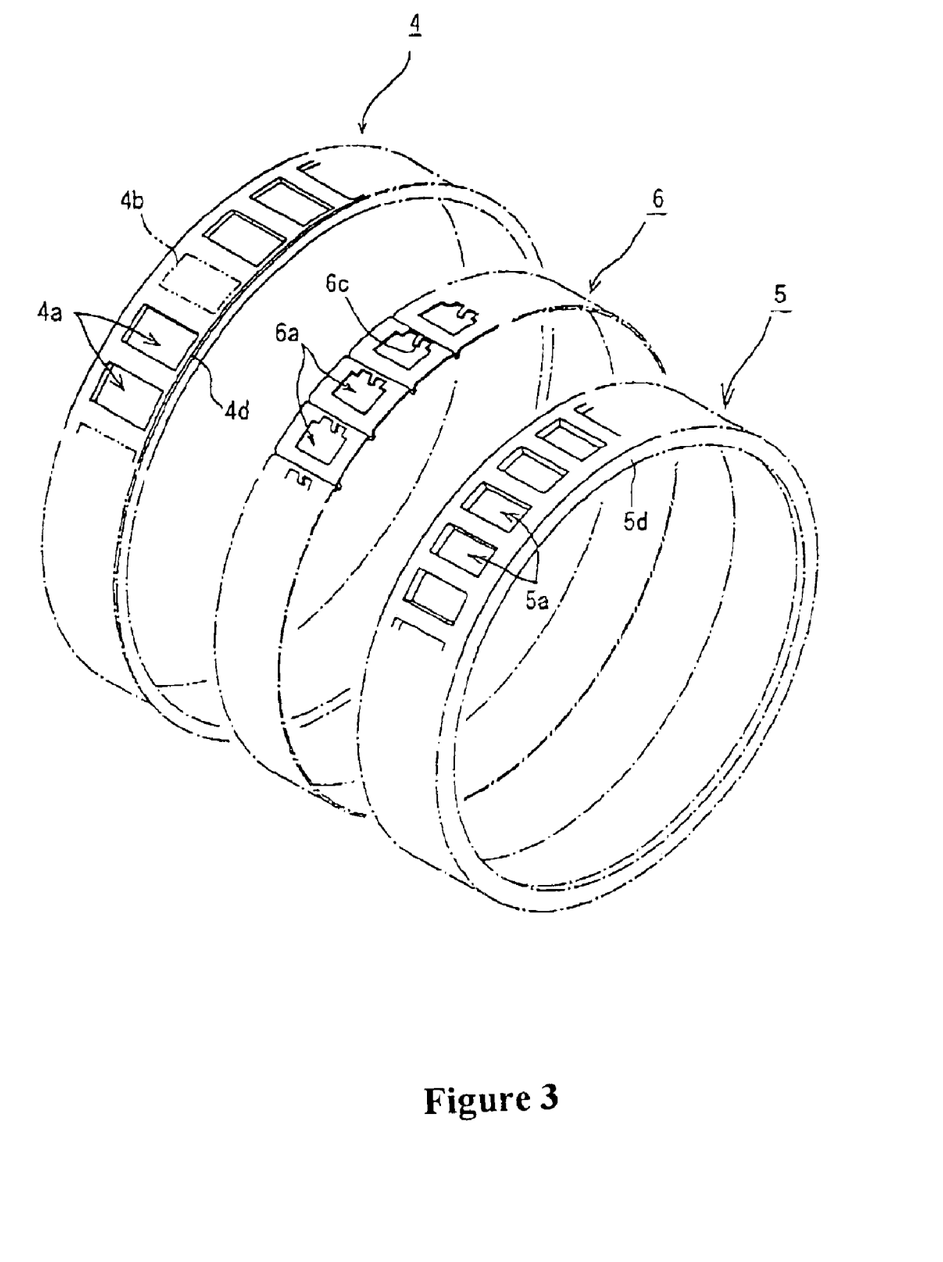
FIG. 3 is a perspective view of an outer side cage, and inner side cage and a ribbon spring which are portions of the one-way clutch of FIG. 1.
Figure 4A:
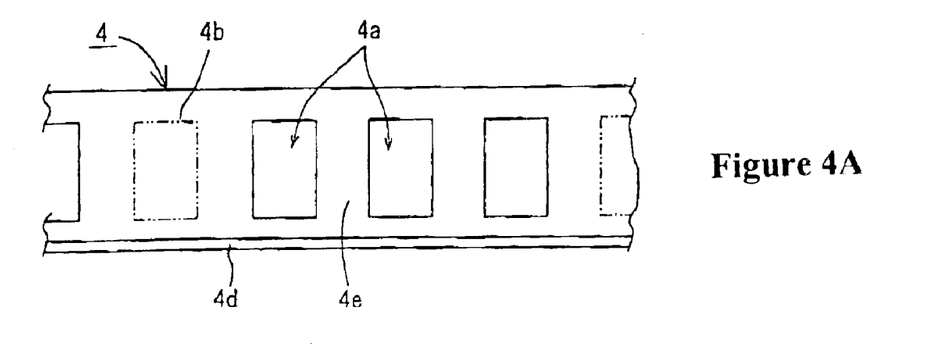
Figure 4B:
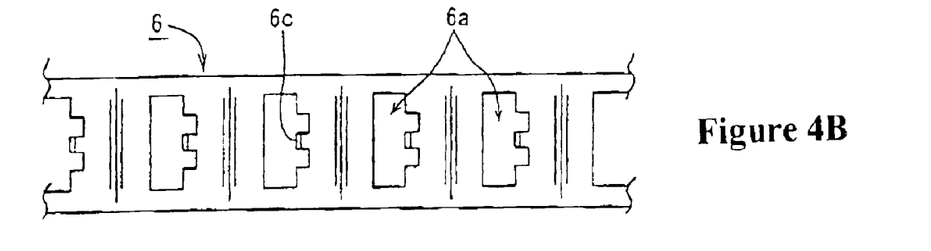
Figure 4C:
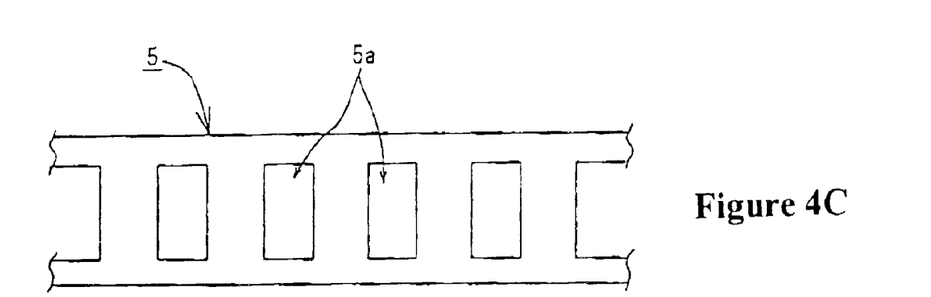

FIG. 1 through FIG. 4 show a first embodiment according to the invention, FIG. 1 is a front view of a one-way clutch according to the first embodiment showing inside thereof by breaking the one-way clutch partially. FIG. 2 is an enlarged sectional view cut along an axial direction of the one-way clutch of FIG. 1 and FIG. 3 is a perspective view of an outer side cage, an inner side cage and a spring member in an annular shape which are portions of the one-way clutch of FIG. 1. FIG. 4 illustrates development views of members shown in FIG. 3, FIG. 4A shows the outer side cage, FIG. 4B shows the spring member and FIG. 4C shows the inner side cage, respectively.

As shown by FIG. 1 and FIG. 2, the one-way clutch according to the first embodiment is provided with an outer ring 1, an inner ring 2, a plurality of sprags 3, 3 . . . arranged at an annular space formed between two of the inner and the outer rings 1 and 2 along a circumferential direction thereof, an outer side cage 4 for retaining the sprags 3 on an outer peripheral side of the annular space, an inner side cage 5 for retaining the sprags 3 on an inner peripheral side of the annular space, a ribbon spring 6 which is a spring member in an annular shape for urging the sprags 3 to erect between two of the inner and the outer rings 1 and 2 by elastic force thereof, and an end bearing 7 for covering two sides in the axial direction of the annular space between two of the inner and the outer rings 1 and 2. Further, in FIG. 1, a white arrow mark indicates a position of arranging an oil tiller port 8 and five pieces of the oil filler ports 8 are arranged at equal intervals in the circumferential direction.

A number of pieces of the sprags 3 arranged between two of the inner and the outer rings 1 and 2 is 20 pieces according to the embodiment. A detailed description will be given later of the number of pieces and positions of arranging the sprags 3 in relation to two of the inner and the outer cages 4 and 5 and the like.

The respective annular members of the outer side cage 4, the inner side cage 5 and the ribbon spring 6 are respectively provided with pockets 4a, 5a and 6a for containing the sprags 3 as is clearly shown in FIG. 3 and FIG. 4.

Among the above-described three annular members, the inner side cage 5 is formed with a constant number (28 pieces according to the embodiment) of the pockets 5a, . . . at a pitch of an equal angle α in the circumferential direction. Therefore, in the inner side cage 6, an interval between the pockets 5a, 5a contiguous to each other is constant in the circumferential direction. The number of the pockets 5a correspond to an upper limit number of pieces of the sprags 3 which is set from a dimension or the like thereof in the one-way clutch according to the embodiment.

Because required transmission torque depends on the environment where the one-way clutch is used, the one-way clutch should be designed so that the transmission torque could be adjusted with a certain range even if the outer ring 1 and the inner ring 2 having same dimensions are used as input and output portions of the one-way clutch. Number of the pieces of the sprags 3 which is required when the one-way clutch having a maximum value of the range of the transmission torque or an approximate value less than the maximum value is manufactured is defined as upper limit number. That is, when the upper limit number of the sprags 3 are used in the one-way clutch, the maximum transmission torque is achieved as the one-way clutch having the sane dimension. As described above, the upper limit number of pieces of the sprags 3 at in the one clutch according to the present embodiment is 28 pieces.

Further, the inner side cage 5 is formed with an edge portion 5d extended from a side edge on one side in the axial direction inwardly in the diameter direction as a reinforcing portion. Such an edge portion may be formed at the side edge on other side edge in the axial direction, or such edge portions may be omitted and a total of the inner side cage 5 may be formed in a shape of a short cylinder. A central portion in the axial direction of the inner side cage 5 may be raised or recessed in comparison with other portion over an entire periphery thereof.

A total of the ribbon spring 6 is formed in the annular shape and includes portions bent inwardly in the diameter direction at respective portions in the circumferential direction. The ribbon spring 6 is also provided with the pockets 6a for sprags of a number (28 pieces) the same as the upper limit number of pieces of the sprags 3 at a pitch of an equal angle α in the circumferential direction similar to the inner side cage 5. Further, the ribbon spring 6 is provided with a tongue piece 6c for elastically pressing the sprag 3 at inside of the pocket 6a to erect along the diameter direction.

Although, the outer side cage 4 is set with pocket forming positions of a number (28 pieces) the same as the upper limit number of pieces of the sprags 3 at a pitch of an equal angle α in the circumferential direction the same as that of the pockets 5a of the inner side cage 5, a number of the pockets 4a which are actually formed is a number smaller than the upper limit number of pieces of the sprag 3. According to the embodiment, among 28 pieces of the pocket forming positions, the pockets 4a are formed at 20 pieces of the pocket forming positions and other 8 pieces of the pocket forming positions remain as pocket nonforming portions 4b. In FIG. 3 and FIG. 4, the pocket nonforming portions 4b are indicated by imaginary lines.

20 pieces of the pockets 4a in the outer side cage 4 are divided into a set of 3 pieces of the pockets 4a aligned at the pitch of the equal angle α in the circumferential direction and a set of 2 pieces of the pockets 4a aligned similarly at the pitch of the equal angle α in the circumferential direction and the two sets are arranged over the entire periphery in the form of interposing the pocket nonforming portions 4b therebetween. In arranging the pockets 4a of the outer side cage 4, any of the pocket 4a is opposed to other of the pocket 4a of the outer side cage 4 in the diameter direction.

Further, although the outer side cage 4 is formed with an edge portion 4d extended from a side edge on one side in the axial direction outwardly in the diameter direction, such an edge portion may be formed at a side edge on other side edge in the axial direction, or both of the edge portions may be omitted. Further, a central portion in the axial direction of the outer side cage 4 may be raised or recessed in comparison with other portion over the entire periphery.

With regard to a method of forming the pockets 4a (5a, 6a) at the annular member of the outer side cage 4 or the like, there are a method of summarizingly punching the total of the pockets 4a (5a, 6a) and a method of successively punching the respective pockets 4a (5a, 6a) along a length direction of the annular member. Although the summarizingly punching method can be adopted for any of the annular members and in that case, the pockets are formed efficiently and swiftly, with regard to the outer side cage 4, there is a case of changing the numbers and the positions of the pockets 4a and the pocket nonforming portions 4b and therefore, the successively punching method is preferable. In that case, even when the numbers and the positions of the pockets 4a and the pocket nonforming portions 4b are changed, it is not necessary to prepare a die in correspondence therewith.

In a state in which the outer side cage 4 is aligned with the ribbon spring 6 and inner side cage 5 coaxially in the same diameter direction, positions of the pockets 4a of the outer side cage 4 are aligned with those of the pockets 6a of the ribbon spring 6 and the pockets 5a of the inner side cage 5 at inner and outer peripheries thereof substantially in the same diameter direction. The sprags 3 are contained in the pockets 4a, 5a and 6a positions of which are aligned to each other at the inner and the outer peripheries. The number of the pockets 4a of the outer side cage 4 is a number the same as the number of pieces of the sprags 3 (20 pieces) and therefore, all of the sprags 3 are contained in the pockets 4a of the outer side cage 4. With regard to the pockets 6a of the ribbon spring 6 and the pockets 5a of the inner side cage 5, portions (8 pieces) of the pockets 5a and 6a remain as pockets in which the sprags 3 are not contained.

By containing the sprags 3 to all of the pockets 4a of the outer side cage 4 as described above, positions of arranging the sprags 3 are the same as positions of the pockets 4a of the outer side cage 4.

That is, the sprags 3 are divided into a set of 3 pieces of the sprags 3 aligned at the pitch of the equal angle α in the circumferential direction and a set of 2 pieces of the sprags 3 similarly aligned at the pitch of the equal angle α in the circumferential direction and the two sets are arranged over the entire periphery in the form of interposing the pocket nonforming portions 4b therebetween. In the arrangement, any of the sprag 3 is opposed to other sprag in the diameter direction.

In the above-described constitution, rotation in one direction is transmitted from one driving ring of either one of the inner and the outer rings 1 and 2 to other driven ring and operation of transmission or nontransmission thereof remains unchanged from that of a case of the same kind of one clutch having sprags.

That is, when the outer ring 1 is rotated in an arrow mark A direction relative to the inner ring 2, the respective sprags 3 are erected at inside of the annular space between two of the inner and the outer rings 1 and 2 and stretched between two of the inner and the outer rings 1 and 2 to be brought into a locked state and rotation in one direction of the outer ring 1 is transmitted to the inner ring 2. When the outer ring 1 is rotated in a reverse direction relative to the inner ring 2, the respective sprags 3 are brought into a fallen attitude to follow rotation of the outer ring 1 and the outer ring 1 is idly rotated relative to the inner ring 2.

The one-way clutch having the above-described constitution includes the sprags 3 of the number of pieces (20 pieces) smaller than the predetermined upper limit number of pieces and can naturally be used as the one-way clutch having transmission torque determined by the number of pieces of the sprags 3.

In the above-described respective constituent portions, the inner side cage 5 and the ribbon spring 6 are respectively formed with the pockets 5a and 6a for sprags of numbers the same as the upper limit number of pieces of the sprags 3 at the pitch of the equal angle α in the circumferential direction and therefore, the numbers of pieces of the sprags 3 to be contained can be increased to the upper limit number of pieces and therefore, can commonly be used for other one-way clutch having the same dimension and a larger number of pieces of using the sprags 3.

Meanwhile, the outer side cage 4 is constructed by a constitution of forming the pockets 4a by the number smaller than the upper limit number of pieces of the sprags 3 and containing the sprag 3 respectively to all of the pockets 4a and therefore, by only viewing the outer side cage 4 from outside, it is known at a glance whether a necessary number of pieces of the sprag 3 are contained or whether portions of the sprag 3 are detached and integration or attachment in which the sprags 3 remain to be deficient can be prevented beforehand.

Further, although positions of arranging the sprags 3 are not equally distributed in the circumferential direction from a relationship between the pockets 4a and the pocket nonforming portions 4b provided at the outer side cage 4, all of the respective sprags 3 are disposed at positions opposed to the other sprags 3 in the diameter direction and are not opposed to portions at which the sprags 3 are not present as is apparent also from illustration in FIG. 1 and therefore, the respective sprags 3 can share a load with excellent balance.

Other than these, in contrast to arranging the oil filler ports 8 at equal intervals in the circumferential direction, the sprags 3 are not distributed equally in the circumferential direction and therefore, even when the total of the sprag 3 are moved in the circumferential direction by any amount, the sprag 3 do not coincide with all of the positions of the oil filler ports 8 and a reduction in the transmission torque which is caused by bringing the sprag 3 into contact with the oil filler port 8 can be reduced. Further, all of the oil filler ports 8 are not closed by the sprags 3 and therefore, filling of oil is carried out smoothly and a drawback accompanied by a deficiency in filling of oil can be prevented from being brought about.

Although according to the above-described embodiment, the outer side cage 4 is provided with the pockets 4a for sprags and the pockets nonforming portions 4b at the pitch of the equal angle α in the circumferential direction, the pockets for sprags and the pocket nonforming portions may be provided at the ribbon spring 6 and may be provided at the inner side cage 5. The pockets for sprags may be provided at the pitch of the equal angle α in the circumferential direction over the entire periphery at at least one of the annular members of the outer side cage 4, the inner side cage 5 and the ribbon spring 6. According to the annular member provided with the pockets for sprags at the pitch of the equal angle α in the circumferential direction over the entire periphery, the number of pieces of the sprags 3 to be contained can be increased or reduced with a number of the pockets as a limit thereof and therefore, can commonly be used also for other one-way clutch having the same dimension and a different number of pieces of using the sprags 3.

Figure 5:
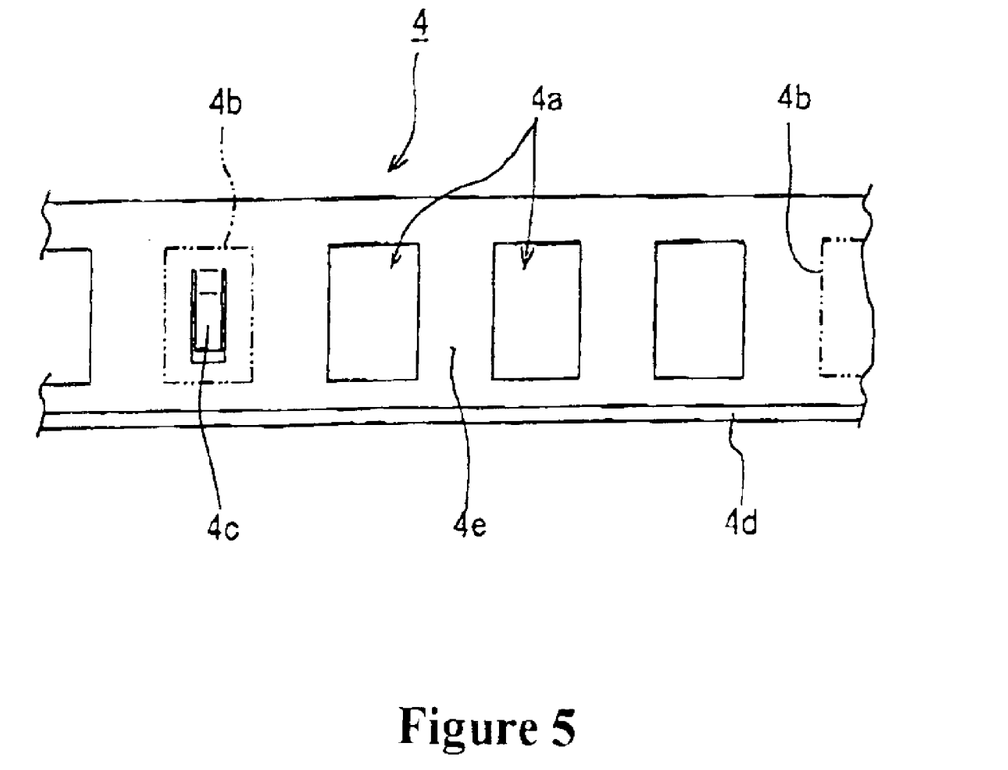
FIG. 5 is a development view showing a modified example of the outer side cage which is a portion of the one-way clutch of FIG. 1.

FIG. 5 shows a modified example of the outer side cage. The outer side cage 4 is provided with the pockets 4a for sprags and the pocket nonforming portions 4b at the pitch of the equal angle α in the circumferential direction and similar to the outer side cage 4 shown in FIG. 3 and FIG. 4 and is further formed with a contact piece 4c which is brought into contact with an inner peripheral face of the outer ring 1 by utilizing the above-described pocket nonforming portion 4b and cutting to raise a portion (or a total) thereof. The contact piece 4c is for increasing friction resistance of the outer side cage 4 relative to the outer ring 1 and by increasing the friction resistance, the outer side cage 4 is rotated to follow the outer ring 1.

The above-described contract piece may be formed by utilizing a pillar portion 4e disposed between the contiguous pockets 4a, 4a at the predetermined pitch and cutting to raise a portion thereof.

Second Embodiment

Figure 6:
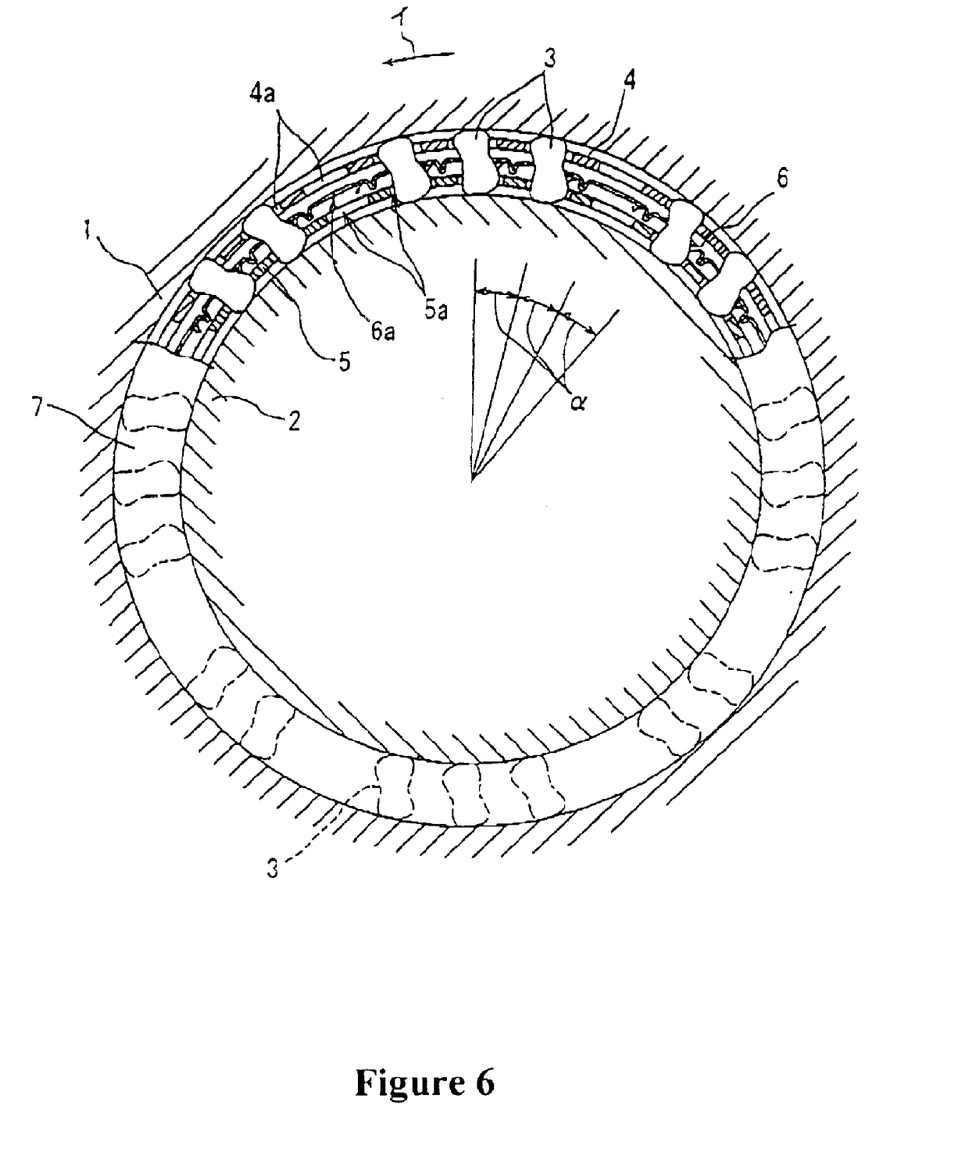
FIG. 6 is a front view of a one-way clutch according to a second embodiment of the invention showing inside thereof by breaking a portion thereof.
Figure 7A:
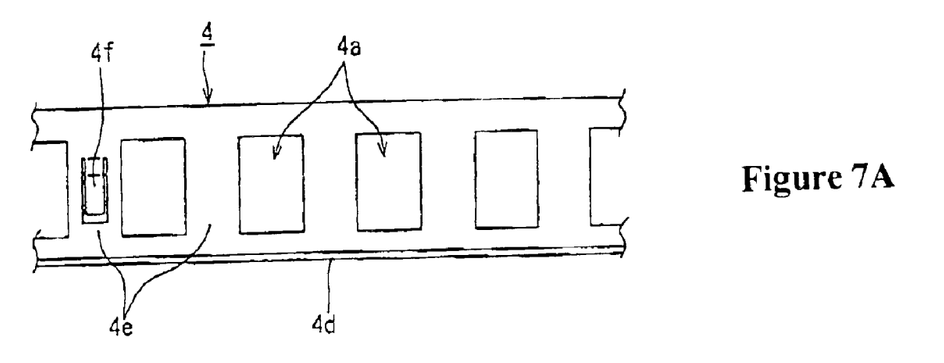
FIGS. 7A and 7B illustrate development views of an outer side cage which is a portion of the one-way clutch of FIG. 6 and FIGS. 7A and 7B show examples in which positions of forming contact pieces differ from each other.
Figure 7B:
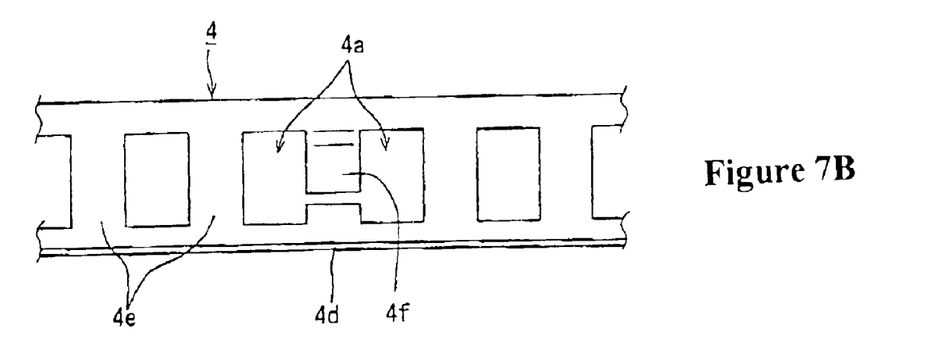

FIG. 6 and FIG. 7 show a second embodiment of the invention, FIG. 6 is a front view of a one-way clutch according to the second embodiment showing inside thereof by breaking a portion thereof. Both of FIGS. 7A and 7B are development views of outer side cages which are portions of the one-way clutch of FIG. 6 and FIGS. 7A and 7B show examples in which positions of forming contact pieces differ from each other.

The one-way clutch according to the second embodiment is the same as the one-way clutch according to the first embodiment in being provided with the outer ring 1, the inner ring 2, the plurality of sprags 3, . . . arranged at the annular space between two of the inner and the outer rings 1 and 2 along the circumferential direction, two of the cages 4 and 5 on the outer side and the inner side for retaining the sprags 3, the ring spring 6 in the annular shape for urging the sprag 3 to erect between two of the inner and the outer rings 1 and 2 by the spring force, and the end bearing 7 for covering the both sides of the annular space between the two of the inner and the outer rings 1 and 2 in the axial direction and portions thereof common to those of the way clutch according to the first embodiment are designated by the same notations.

According to the one-way clutch of the second embodiment, the respective annular members of the outer side cage 4, the inner side cage 5 and the ribbon spring 6 are respectively formed with a constant number (28 pieces in the illustration) of the pockets 4a, 5a, 6a at the pitch of the equal angle α in the circumferential direction over the entire periphery. Therefore, as shown by FIGS. 7A and 7B, the outer side cage 4 is not provided with the pocket nonforming portion 4B as in the outer side cage 4 according to the first embodiment and an interval between the pockets 4a, 4a contiguous to each other in the circumferential direction is constant in the outer side cage 4. The outer side cage 4 of FIG. 7A is formed with a contact piece 4f which is brought into contact with the inner peripheral face of the outer ring 1 by utilizing the pillar portion 4e disposed between the pockets 4a, 4a contiguous to each other in the circumferential direction and cutting to raise a portion thereof. The outer side cage 4 of FIG. 7B is formed with the contact piece 4f in contact with the inner peripheral face of the outer ring 1 by cutting to raise a total of the pillar portion 4e between the pockets 4a, 4a contiguous to each other in the circumferential direction.

The shapes of the inner side cage 5 and the ribbon spring 6 remain unchanged from those of the first embodiment and therefore, illustration over a detailed portion thereof is omitted.

As same in the first embodiment, the upper limit number of pieces is 28 pieces in the embodiment.

The numbers of the pockets 4a, 5a and 6a of the respective annular members of the outer side cage 4, the inner side cage 5 and the ribbon spring 6 are 28 pieces in correspondence with the upper limit number of pieces of the sprags 3.

The sprags 3 are contained in the respective pockets 4a, 5a and 6a of the outer side cage 4, the inner side cage 5 and the ribbon spring 6 and the number of pieces of the sprags 3 to be contained is smaller than the above-described upper limit number of pieces and is 20 pieces according to the embodiment.

20 pieces of the sprags 3 are divided into a set of 3 pieces thereof aligned at the pitch of the equal angle α in the circumferential direction and a set of 2 pieces similarly aligned at the pitch of the equal angle α in the circumferential direction and the two sets are arranged over the entire periphery in the form of interposing vacant ones of the pockets 4a, 5a and 6a which do not contain the sprag 3 therebetween. According to the arrangement, any of the sprag 3 is opposed to the other sprag 3 in the diameter direction.

The one-way clutch having the above-described constitution includes the sprags 3 of 20 pieces smaller than the upper limit number of pieces and can naturally be used as a one-way clutch having transmission torque determined by the number of pieces (20 pieces of the sprags.

In the above-described respective constituent portions, the outer side cage 4 and the inner side cage 5 and the ribbon spring 6 are respective formed with the pockets 4a, 5 and 6a of numbers the same as the upper limit number of pieces of the sprags 3 by the pitch of the equal angle α in the circumferential direction and therefore, the number of pieces of the sprag 3 to be contained can be increased up to the upper limit number of pieces. When the number of pieces of the sprags 3 to be contained is set to 28 pieces, the sprags 3 are arranged at the pitch of the equal angle α in the circumferential direction over the entire periphery in correspondence with the positions of the pockets 4a of the outer side cage 4 or the like and can be used for the one-way clutch having larger transmission torque determined by the number of pieces (28) of the sprags 3.

Further, according to the outer side cage 4 and the inner side cage 5 and the ribbon spring 6, the numbers of pieces of the sprags 3 to be contained can respectively be increased or reduced with the upper limit number of pieces of the sprags 3 as a limit and therefore, can commonly be used for other one-way clutch having the same dimension and a different number of pieces of using the sprags 3.

Further, when the number of pieces of using the sprags 3 is set to a number of pieces other than the above-described, it is preferable that the number of pieces are constituted by an even number and the respective sprags 3 are arranged to be opposed to the other sprags 3 in the diameter direction. According to the arrangement, all of the sprags 3 can share a load with excellent balance since the other sprags 3 are present at positions thereof opposed thereto in the diameter direction and the sprag 3 are not opposed to portions at which the sprags 3 are not present.

Other Embodiment

Although according to the first and the second embodiments, an explanation has been given such that the one-way clutch includes the outer ring 1 and the inner ring 2, a member on the driving side and a member on the driven side disposed at portions of attaching the one-way clutch may respectively be utilized as the outer ring and the inner ring. In that case, the one-way clutch is constituted by omitting the outer ring 1 and the inner ring 2 and the one-way clutch is mounted to an annular space formed between the driving side member and the driven side member.

Further, the end bearings 7 provided at the one-way clutches according to the first and the second embodiments may be omitted.

According to the first invention of the case, in sum, the annular members of the outer side cage, the inner side cage and the like are respectively formed with the pockets for sprags of sufficiently large numbers, the pockets is contained with the sprags of the number of pieces smaller than the number of the pockets in a state having an allowance in the number of pieces of the pockets, when the number of pieces of the sprags contained in the pockets is increased, the one-way clutch having the larger transmission torque is constituted and therefore, the annular member of the outer side cage or the like having the pockets can commonly be used for other one-way clutch having the same dimension and a larger number of pieces of using the sprags as a common part. Therefore, it is not necessary to fabricate the annular member of the outer side cage or the like at each time of a different number of pieces of using the sprags and a reduction in cost can be achieved.

According to the second invention, at least one annular member in the annular members of the outer side cage and the like is formed with the pockets for sprags of a sufficiently large number, other annular member is formed with the pockets of a smaller number and the sprags are contained to all of the pockets of the smaller number and the annular member having the pockets of the sufficiently large number can commonly be used in other one-way clutch having the same dimension and a larger number of pieces of using the sprags.

According to the second embodiment, when the annular member formed with the pockets by a number smaller than that of the other annular member is the outer side cage, all of the pockets of the outer side cage are contained with the sprags and therefore, it is known at a glance whether a necessary number of pieces of the sprags are contained by only viewing the outer side cage from outside and integration or attachment in which the sprags remains to be deficient can be prevented beforehand.

What is claimed is:

1. A one-way clutch mounted to an annular space formed between a driving side member and a driven side member for transmitting rotation of the driving side member in one direction to the driven side member, the one-way clutch comprising:

a plurality of sprags arranged at the annular space along a circumferential direction thereof;

a first cage formed on an inner side at the annular space, wherein the first cage includes:

a first plurality of retaining pockets for retaining the plurality of sprags; and at least one non-retaining pocket which does not retain any of the plurality of sprags, wherein a sum of a number of the first plurality of retaining pockets and a number of the at least one non-retaining pocket formed on the first cage is greater than a number of the plurality of sprags;

a second cage formed on an outer side at the annular space, wherein the second cage includes a second plurality of retaining pockets for retaining the sprags, and wherein a total number of pockets formed on the second cage is equal to the number of the plurality of sprags;

an annular spring member disposed between the first cage and the second cage, wherein the annular spring member includes:

a plurality of urging pockets for urging the plurality of sprags to thereby erect the plurality of sprags; and at least one non-retaining pocket which does not urge any of the plurality of sprags, wherein the first plurality of retaining pockets and the at least one non-retaining pocket of the first cage are formed through the first cage at a pitch of a substantially equal angle in the circumferential direction, and wherein respective positions of the first plurality of retaining pockets of the first cage, respective positions of the second plurality of retaining pockets of the second cage, and respective positions of the urging pockets of the spring member correspond to each other in the radial direction thereof.

2. The one-way clutch according to claim 1, wherein the first cage is an inner side cage and the second cage is an outer side cage.

3. The one-way clutch according to claim 1, wherein the sum of the number of the first plurality of retaining pockets and the number of the at least one non-retaining pocket of the first cage corresponds to an upper limit number of pieces of the plurality of sprags which is set for an upper limit value of a required transmission torque.

4. The one-way clutch according to claim 1, wherein the number of the plurality of sprags is an even number and the respective sprags are arranged at positions opposed to the other sprags in the diameter direction.

5. The one-way clutch according to claim 1, wherein the first plurality of retaining pockets and the non-retaining pockets of the first cage have a same shape, and the urging pockets and the non-urging pockets have a shame shape.

* * * * *